Feb. 26, 1952 L. H. FLORA 2,587,134
COMBINED NUT RETAINER AND THREAD LOCK
Filed Feb. 15, 1950
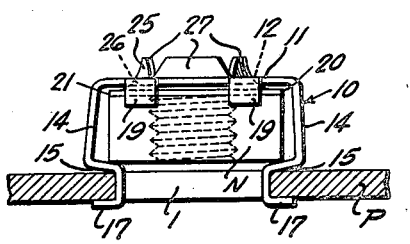
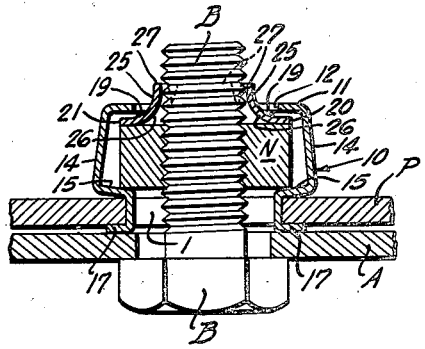
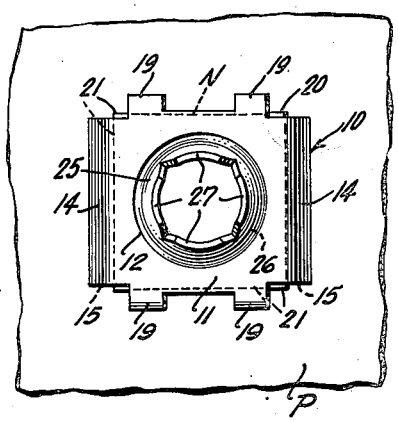
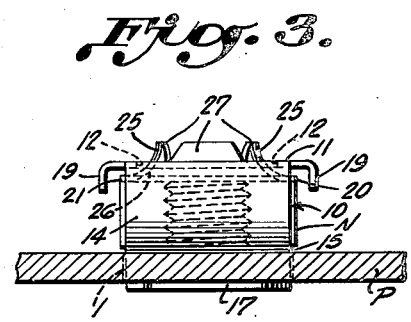
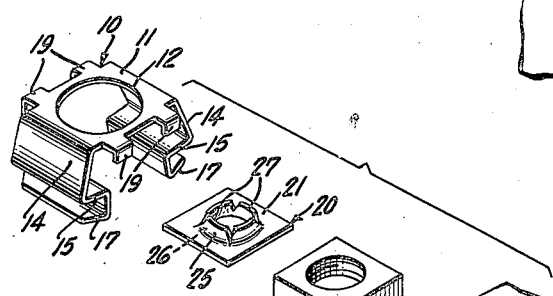
INVENTOR.
LAURENCE H. FLORA
BY
*H. L. Lombard*
ATTORNEY Patented Feb. 26, 1952

2,587,134

UNITED STATES PATENT OFFICE 2,587,134

COMBINED NUT RETAINER AND THREAD LOCK

Laurence H. Flora, Cleveland, Ohio, assignor to Tinnerman Products, Inc., Cleveland, Ohio, a corporation of Ohio Application February 15, 1950, Serial No. 144,216

1 Claim. (Cl. 151—41.75)

This invention relates in general to combined nut retainer and thread locks and deals, more particularly, with an improved fastener for holding a nut in fastening position in an assembly during the application of a cooperating bolt or screw thereto and otherwise locking the bolt or screw in its applied fastening position with the nut.

In many installations, it is necessary or desirable to use a standard nut and bolt fastening means but it is usually a difficult problem, especially in blind locations, for a worker to hold the nut in place as the cooperating fastener is applied, or otherwise, to maintain the same against relative rotation during the final tightening of the fasteners. In such an assembly in which the rearward side of a part is not conveniently or readily accessible for holding a nut in fastening position prior to the application of the cooperating bolt, it has been the practice to resort to various forms of cage devices requiring a welding or riveting operation for attaching the same in providing means for holding the nut in fastening position. A welding or riveting operation involves considerably increased costs in manufacture which often make the use of this type of holder prohibitive in many locations where a cheap and inexpensive fastening means is required. Welded or riveted holders otherwise are objectionable by reason of the inordinate amount of time required in the installation thereof and the lack of any provision for shifting of the nut in attached position to compensate for misalignment of the openings in the parts secured.

It is also frequently necessary or desirable in such a fastening installation to provide for a positive locking action of the bolt or screw in tightened fastening engagement with the nut; and a primary object of the present invention is to provide an improved construction for a combined nut and nut holder of the kind described together with a separate locking member for effecting an automatic locking action on the bolt or screw applied to the nut.

A further object of the invention is to provide an improved fastening device of this character which comprises a spring holder for retaining a nut in attached position on a support together with a separate bolt locking member and in a manner whereby the nut and bolt locking member are adapted for shifting or adjustment as necessary to compensate for misalignment of the bolt openings in the parts secured.

Another object of the invention is to provide an improved fastening device such as described which comprises a spring holder for retaining a nut in attached position on a support together with a separate bolt locking member that is interconnected to the spring holder in assembled relation therewith.

A further object of the invention is to provide an improved construction for such a fastening device comprising a spring holder for retaining a nut in attached position on a support together with a separate bolt locking member having a projecting collar portion which is interconnected to the spring holder to retain the same in assembled relation with the spring holder and which otherwise provides an automatic locking action on the bolt or screw applied to the nut.

Further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 shows a fastening device in accordance with the invention as seen in side elevation in attached position on a supporting part, represented in section;

Fig. 2 is a vertical sectional view through a completed assembly showing the bolt applied to the nut member and locked in applied position by the locking member of the improved fastening device;

Fig. 3 is an end view of the fastening device shown in Fig. 1;

Fig. 4 is a top plan view of the fastening device seen in Figs. 1 and 3; and,

Fig. 5 is an exploded perspective view showing the members of the fastening device in their relative positions for assembly and for attachment to an apertured supporting panel.

Referring now, more particularly, to the drawings, the improved fastening device of the invention is shown comprising a nut holder 10 which retains a nut N and a separate bolt locking member 20 in assembled relation for attachment in a recess 1 in a supporting part P. The nut holder 10 is constructed from a suitable sheet metal section of a size and configuration determined by the shape and size of the nut with which it is to be used and, of course, may be readily provided for use with any conventional threaded nut. In the present example, the spring holder 10 is shown as provided for use with a standard square threaded nut N to be attached in fastening position over a generally rectangular recess 1 in a supporting part such as a panel or plate P. The nut holder 10 may be readily constructed for attachment in a circular hole or other aperture of any selected design but the use of a generally rectangular recess, as illustrated in Fig. 5, is advantageous in that it is relatively simple to form and otherwise provides for a fixed nonrotative attachment of the nut holder in operative position. Any suitable sheet metal may be employed for making the nut holder 10 but preferably that of a spring metal nature such as spring steel or cold rolled steel having spring like characteristics.

The sheet metal blank forming the nut holder is bent to define a central body portion 11 having an enlarged opening or passage 12, and end portions extending in the same general direction to form a pair of spring fingers or spring arms 14 having opposing wall portions disposed in slightly outwardly inclined relation. These spring arms 14 may be of any suitable width commensurate with the size of the nut while the free end portions thereof are provided in a width slightly less than the width of the panel opening 1. Said free end portions of the spring arms are bent to form inturned flanges 15 together with return bent outwardly extending hook elements 17, or the like, which, in untensioned relation, are spaced apart a distance greater than the width of the panel recess 1. The said hook elements 17 otherwise are preferably provided in a predetermined spacing from the inturned flanges 15 corresponding substantially to the thickness of the panel adjacent the panel recess 1 so as to clasp opposing marginal portions of the panel recess in snug frictional engagement therewith. Preferably, the spring fingers or spring arms 14 extend from the central body portion 11 in entirely free and independent relation so that they are highly yieldable and may be readily flexed as necessary for an easy and quick attachment of the hooks 17 with the edges of the panel recess 1. At each side of the nut holder 10, one or more tabs 19 and preferably a pair of such tabs, as shown, are bent to extend downwardly from the side edges of the central body portion 11 in position to retain the nut N in assembled relation with the nut holder 10.

The locking member 20 is provided preferably of spring metal in the form of a simple sheet metal stamping having a base corresponding substantially to the shape of the nut N. In the present example, the locking member 20 is formed with a generally rectangular base 21 approximating the shape and size of the generally rectangular nut N, and is provided with a central annular collar or hub in the form of a substantially tubular projection 25 pressed upwardly out of the plane of said sheet metal base 21. The upstanding annular collar 25 preferably is formed with an outwardly flared, enlarged entrance 26 for the bolt adjacent the base 21 of the locking member, as seen in Fig. 2, and is provided with a series of radial slits or notches forming one or more projecting spring tongues 27, or the like, on the outer end of said collar 25. The projecting spring tongues 27 actually are segments of the upstanding annular collar 25 and are bent slightly inwardly in their normal untensioned relation so that the opening between said tongues 27 is slightly smaller than the bolt opening in the associated nut N. Said tongues 27, accordingly, are adapted to serve as locking elements in the manner of a lock washer to effect a binding frictional and gripping engagement on the crests of the thread convolutions on the bolt B passing through the nut N, Fig. 2, as presently to be described.

Fig. 5 illustrates the nut N and associated locking member 20 in their relative positions for assembly in the holder 10. In the assembly of these members, the locking member 20 is inserted between the arms 14 of the holder 10 to a position in which the base 21 of the locking member is disposed against the inner side of the central body portion 11 of the holder and with the annular collar 25 thereon projecting through the enlarged opening 12 therein. The nut N is slipped between the arms 14 of the holder together with the locking member 20, or immediately thereafter, to a position in which the nut N is retained between the inturned flanges 15 on the arms of the holder. The nut N thus supports the locking member 20 in assembled relation within the nut holder substantially as shown in Figs. 1–3, inclusive, with the upstanding collar 25 thereon projecting outwardly through the enlarged opening 12 in the central body of the nut holder, as aforesaid. In this regard, the projecting collar 25 retains the locking member 20 in interconnected relation with the holder 10 in a manner to limit the lateral movement of the locking member and thereby prevent disassembly thereof from said nut holder 10.

In general, the nut holder 10 defines a cage like structure in which the nut N and the locking member 20 are nonrotatably retained between the opposing walls of the spring arms 14 at the ends of the nut holder and between the spaced tabs 19 at the sides of the nut holder. The nut holder 10 is constructed to conform generally to the shape of the nut N but in a somewhat larger size to provide for a floating mounting of said nut N and the associated locking member 20 within the nut holder. The nut N and locking member 20, as thus retained by the nut holder 10 of relatively larger size, have their bolt passages in line with the enlarged opening 12 in the central body of the holder and are capable of considerable shifting or adjustment within the nut holder as necessary to compensate for misalignment or other irregularities in the bolt holes in the parts secured. Inasmuch as the opening 12 in the central body of the holder is of larger size than the annular collar 25 on the locking member 20, the locking member is adapted to shift to any position necessary for alignment of the tongues 27 with the bolt opening in the nut N for properly receiving the threaded end of the bolt B as it passes through the nut N.

The assembled fastening device, thus provided, is easily and quickly attached in the panel recess 1 simply by compressing the outwardly inclined opposing wall portions of the spring arms 14 to move the hooks 17 on the ends thereof inwardly toward each other. In this relation, the hooks 17 still have their extremities farther apart than the width of the panel recess 1. Accordingly, in attaching the nut holder, one hook is passed through the recess 1 with the other hook resting on the face of the panel P adjacent said recess 1. The clearance between the nut and the spring arms 14 enables the latter hook to be pressed inwardly and sprung sufficiently so that it may also pass through the recess 1 and thus be received in said recess. The spring arms 14 are then released from their compressed condition and in attempting to assume their normal outwardly inclined relation, both hooks 17 are forced to spread apart and thereby frictionally and grippingly engage the adjacent marginal edges of the panel recess 1, as shown in Figs. 1 and 2, to retain the fastening device in attached position. The spring arms 14, as thus attached, do not assume their normal untensioned relation but rather, remain biased slightly inwardly in the engaged position of the hooks as illustrated in Figs. 1 and 2. Accordingly, the attachment of the hooks 17 on the spring arms is effected entirely by spring action and without need for mechanical bending of said hooks.

In the fully attached position of the nut holder, the inwardly bent flanges 15 hold the nut N slightly out of contact with the panel P and accordingly, in applying the bolt B to complete an installation, such as a part A secured to the panel P as shown in Fig. 2, the nut N is drawn against said inward flanges 15 to flatten and thereby tension the same. The spring force thus set up in said inward flanges 15 tends to urge the nut N outwardly from the panel P in a manner which causes a frictional binding between the nut threads and the threads on the bolt to produce a certain amount of thread locking action on the bolt B in this regard.

The primary positive bolt locking action, however, is provided by the spring tongues 27 on the locking member 20 in binding, frictional and gripping engagement with the thread convolutions on the end of the bolt B, substantially as shown in Fig. 2. The arrangement is such that as the bolt B, Fig. 2, passes through the nut N, the leading end of the bolt enters the outwardly flared enlarged entrance 26 to the annular collar 25 on the locking member 20 and thereby causes a shifting of said locking member 20 as necessary to align said collar 25 in concentric relation to the thread opening in the nut. The bolt end, accordingly, passes into said collar 25 and into engagement with the inwardly bent spring tongues 27 on the outer end of said collar 25. The opening between said spring tongues 27 in their normal untensioned relation is slightly smaller than the cross-section of the bolt B and therefore, as the bolt is advanced, said tongues 27 are forced to yield outwardly as necessary for the bolt to pass therebetween to tightened fastening position substantially as shown in Fig. 2. In this relation, said spring tongues 27 exert a pronounced binding and gripping action on the crests of one or two or more of the engaged thread convolutions on the bolt B to provide a positive locking action on the bolt which prevents loosening or reverse turning thereof from its applied fastening position.

While the invention has been described in detail with a specific example, such example is intended as an illustration only inasmuch as the invention fully contemplates various changes in the construction, arrangement and application of the fasteners within the broad scope of the instant disclosure.

What is claimed is:

A fastening unit comprising a nut and sheet metal holder for retaining said nut in adjustable position over a recess in a supporting part, said holder comprising a piece of sheet metal bent to provide a body portion overlying said nut and having an enlarged opening therein larger than the thread opening in said nut and means integral with said body portion loosely retaining said nut in said holder, said holder being provided with means for attaching the fastening unit to said supporting part, a separate sheet metal locking plate positioned between said body portion of the holder and the adjacent surface of the nut and being of such size as to be loosely retained in laterally adjustable relation in said holder, said locking plate being provided with a preformed substantially tubular projection projecting outwardly out of the plane thereof and having a bolt passage therein, said substantially tubular projection on the locking plate projecting through said enlarged opening in the body portion of the holder to retain said locking plate in assembled relation with said nut and holder, said substantially tubular projection on the locking plate being movable within said enlarged opening in the body portion of the holder to permit alignment of the bolt passage therein with the thread opening in the nut in any adjusted position of said nut, said substantially tubular projection on the locking plate defining means for engaging a bolt passing through the nut to lock the bolt in its applied fastening position.

LAURENCE H. FLORA.

REFERENCES CITED

The following references are of record in the file of this patent:

UNITED STATES PATENTS

| Number | Name | Date |
| --- | --- | --- |
| 1,600,665 | Cocks | Sept. 21, 1926 |
| 2,192,087 | Kost | Feb. 27, 1940 |
| 2,274,014 | Tinnerman | Feb. 24, 1942 |
| 2,350,315 | Kral | May 30, 1944 |
| 2,391,046 | Tinnerman | Dec. 18, 1945 |
| 2,406,415 | Tinnerman | Aug. 27, 1946 |
| 2,495,037 | Tinnerman | Jan. 17, 1950 |